(12) United States Patent
Zhou et al.

(10) Patent No.: US 9,415,350 B2
(45) Date of Patent: Aug. 16, 2016

(54) METHOD OF FORMING A REWETTABLE ASYMMETRIC MEMBRANE

(75) Inventors: Jinsheng Zhou, Woodbury, MN (US); Jonathan F. Hester, Hudson, WI (US); Derek J. Dehn, Maplewood, MN (US); Daniel P. Meehan, St. Paul, MN (US); Robin E. Wright, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 392 days.

(21) Appl. No.: 12/997,666

(22) PCT Filed: May 13, 2009

(86) PCT No.: PCT/US2009/043690
§ 371 (c)(1),
(2), (4) Date: Dec. 13, 2010

(87) PCT Pub. No.: WO2010/002502
PCT Pub. Date: Jan. 7, 2010

(65) Prior Publication Data
US 2011/0094960 A1    Apr. 28, 2011

Related U.S. Application Data

(60) Provisional application No. 61/077,077, filed on Jun. 30, 2008.

(51) Int. Cl.
*B01D 71/28* (2006.01)
*B01D 71/82* (2006.01)
(Continued)

(52) U.S. Cl.
CPC .......... *B01D 69/125* (2013.01); *B01D 67/0006* (2013.01); *B01D 69/10* (2013.01); *B01D 71/28* (2013.01); *B01D 71/82* (2013.01); *B01D 2323/30* (2013.01); *B01D 2323/345* (2013.01); *B01D 2325/022* (2013.01); *B01D 2325/14* (2013.01); *B01D 2325/16* (2013.01); *B01D 2325/18* (2013.01); *B01D 2325/36* (2013.01); *B01D 2325/38* (2013.01)

(58) Field of Classification Search
None
See application file for complete search history.

(56) References Cited

U.S. PATENT DOCUMENTS 1,529,256 A    3/1925    Kelley
3,944,485 A    3/1976    Rembaum
(Continued)

FOREIGN PATENT DOCUMENTS

EP    0 203 459    12/1986
EP    0 481 517    10/1991
(Continued)

OTHER PUBLICATIONS

Dai, et al., "Hollow Fiber-Supported Hydrogels with Mesh Size Asymmetry" *Journal of Membrane Science*, vol. 171, pp. 79-86 (2000).
(Continued)

*Primary Examiner* — Krishnan S Menon
(74) *Attorney, Agent, or Firm* — Qiang Han

(57) ABSTRACT

The present disclosure provides rewettable asymmetric membranes and methods of forming rewettable asymmetric membranes. More specifically, methods are provided for forming rewettable asymmetric membranes having a copolymer and a polymerized material retained within the porous substrate.

27 Claims, 1 Drawing Sheet

(51) Int. Cl.
*B01D 67/00* (2006.01)
*B01D 69/12* (2006.01)
*B01D 69/10* (2006.01)

(56) References Cited

U.S. PATENT DOCUMENTS

| | | | |
|---|---|---|---|
| 4,157,418 | A | 6/1979 | Heilmann |
| 4,379,201 | A | 4/1983 | Heilmann |
| 4,539,256 | A | 9/1985 | Shipman |
| 4,618,533 | A | 10/1986 | Steuck |
| 4,726,989 | A | 2/1988 | Mrozinski |
| 4,867,881 | A | 9/1989 | Kinzer |
| 4,957,620 | A | 9/1990 | Cussler |
| 5,049,275 | A | 9/1991 | Gillberg-LaForce |
| 5,084,173 | A | 1/1992 | Nitadori |
| 5,120,594 | A | 6/1992 | Mrozinski |
| 5,260,360 | A | 11/1993 | Mrozinski |
| 5,294,338 | A | 3/1994 | Kamo |
| 5,468,390 | A | 11/1995 | Crivello |
| 5,547,756 | A | 8/1996 | Kamo |
| 5,891,530 | A | 4/1999 | Wright |
| 5,962,544 | A | 10/1999 | Waller, Jr. |
| 6,258,276 | B1 | 7/2001 | Mika |
| 6,287,730 | B1 | 9/2001 | Callahan |
| 6,451,386 | B1 | 9/2002 | Simonetti |
| 6,793,820 | B1 | 9/2004 | McCray |
| 7,247,370 | B2 | 7/2007 | Childs |
| 2002/0148774 | A1 | 10/2002 | Wang |
| 2003/0225439 | A1 | 12/2003 | Cook |
| 2004/0185242 | A1 | 9/2004 | Charkoudian |
| 2005/0011826 | A1 | 1/2005 | Childs |
| 2005/0058821 | A1 | 3/2005 | Smith |
| 2005/0218069 | A1 | 10/2005 | Lee |
| 2006/0000778 | A1 | 1/2006 | Childs |
| 2007/0154651 | A1* | 7/2007 | Weiss et al. .................. 427/532 |
| 2007/0196151 | A1 | 8/2007 | Ferrar |
| 2009/0176052 | A1* | 7/2009 | Childs et al. .................. 428/101 |

FOREIGN PATENT DOCUMENTS

| | | |
|---|---|---|
| EP | 1 464 380 | 10/2004 |
| EP | 1 574 249 | 9/2005 |
| JP | 04-126798 | 4/1992 |
| JP | 04-346825 | 12/1992 |
| JP | 08-311771 | 11/1996 |
| JP | 2003 301069 | 10/2003 |
| JP | 2004-534647 | 11/2004 |
| RU | 1 808 952 | 4/1993 |
| WO | WO 01/05492 | 1/2001 |
| WO | WO 03/008078 | 1/2003 |
| WO | WO 2006/015495 | 2/2006 |
| WO | WO 2006/034575 | 4/2006 |
| WO | WO 2007/127848 | 11/2007 |

OTHER PUBLICATIONS

Li, et al., "Characterization and Mechanical Support of Asymmetric Hydorgel Membranes Based on the Interfacial Cross-Linking of Poly(Vinyl Alcohol) With Toluene Diisocyanate" *Journal of Membrane Science*, vol. 111, pp. 115-122 (1996).

Wente, V.A., "Manufacture of Super Fine Organic Fibers"; *Naval Research Laboratories* (Report No. 4364) (May 25, 1954).

Wente, V.A., "Superfine Thermoplastic Fibers"; *Industrial Engineering Chemistry*, vol. 48, pp. 1342-1346 (1956).

* cited by examiner

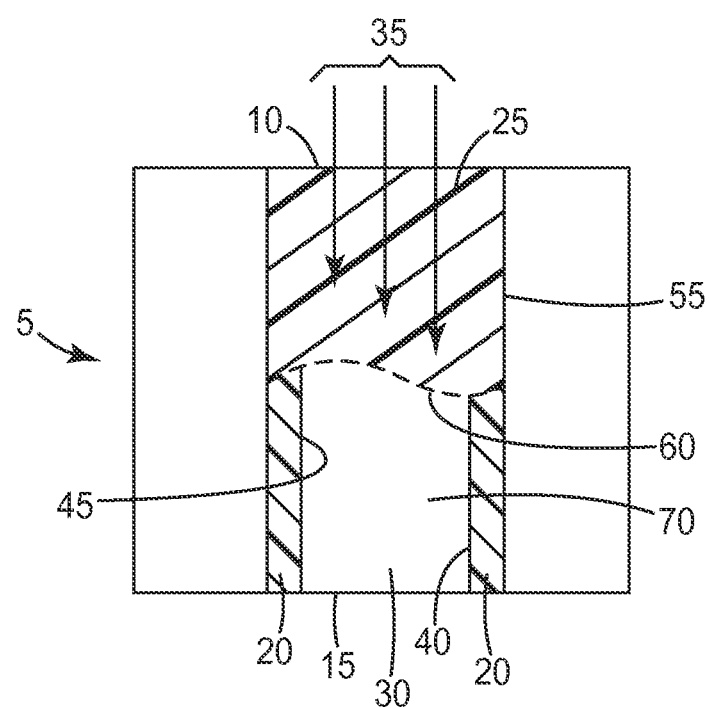

METHOD OF FORMING A REWETTABLE ASYMMETRIC MEMBRANE

CROSS REFERENCE TO RELATED APPLICATIONS

This application is a national stage filing under 35 U.S.C. 371 of PCT/US 2009/043690, filed May 13, 2009, which claims priority to Provisional Application Ser. No. 61/077, 077, filed Jun. 30, 2008, the disclosures of which are incorporated by reference in their entirety herein.

FIELD

The present disclosure relates to a method of forming a rewettable asymmetric membrane.

BACKGROUND

Membranes can be used in separation processes where certain species are retained and other species are allowed to pass through the membrane. Some membrane applications include, for example, use in food and beverage, pharmaceutical, medical, automotive, electronic, chemical, biotechnology, and dairy industries.

Rewettable asymmetric membranes have been described.

SUMMARY

The present disclosure provides rewettable asymmetric membranes and methods of forming rewettable asymmetric membranes. More specifically, methods are provided for forming rewettable asymmetric membranes having a copolymer and a polymerized material retained within the porous substrate.

In one aspect, a method of forming a rewettable asymmetric membrane is provided, the method comprising:
  providing a porous substrate having a first major surface, interstitial pores, and a second major surface;
  applying a polymerizable composition to the first major surface of the porous substrate to provide a coated porous substrate, the polymerizable composition comprising
    i) at least one polymerizable species;
    ii) at least one copolymer comprising hydrophilic and hydrophobic groups; and
    iii) at least one photoinitiator; and
  exposing the coated porous substrate to ultraviolet radiation to polymerize the polymerizable composition and provide the rewettable asymmetric membrane, the membrane comprising a gradient of polymerized material extending from the first major surface to the second major surface with copolymer within portions of the interstitial pores unoccupied by the polymerized material, and wherein the second major surface is substantially free of the polymerized material.

In another aspect, a rewettable asymmetric membrane is provided. The rewettable asymmetric membrane comprises a porous substrate having a polymerized material and a copolymer retained within the porous substrate. The rewettable asymmetric membrane has a gradient of polymerized material extending from a first major surface to a second major surface such that the copolymer collects on a portion of the interstitial pores unoccupied by the polymerized material and the second major surface is substantially free of the polymerized material.

BRIEF DESCRIPTION OF THE DRAWINGS

FIG. 1 is a schematic representation of a coated porous substrate irradiated with an ultraviolet radiation source forming a rewettable asymmetric membrane.

DETAILED DESCRIPTION

The recitation of numerical ranges by endpoints includes all numbers subsumed within that range (e.g., 1 to 5 includes 1, 1.5, 2, 2.75, 3, 3.8, 4, and 5).

As included in this specification and the appended claims, the singular forms "a", "an", and "the" include plural referents unless the content clearly dictates otherwise. Thus, for example, reference to a composition containing "a compound" includes a mixture of two or more compounds. As used in this specification and appended claims, the term "or" is generally employed in its sense including "and/or" unless the content clearly dictates otherwise.

Unless otherwise indicated, all numbers expressing quantities or ingredients, measurement of properties and so forth used in the specification and claims are to be understood as being modified in all instances by the term "about."

In the method of the invention, a rewettable asymmetric membrane is provided. Ultraviolet radiation is utilized for initiating a polymerization reaction in polymerizable compositions to thereby provide a polymerized material that is retained within the pores of a porous substrate. The polymerized material is retained in a concentration gradient extending at least partially through the thickness of the substrate with copolymer collected on inner portions of the pores unoccupied by the polymerized material.

A number of methods can be suitable for forming a gradient of polymerized material extending at least partially through the thickness of the porous substrate. One method involves coating one side of the substrate with polymerizable composition and thereafter exposing the porous substrate and the polymerizable composition to ultraviolet radiation such that there is a gradient intensity of light penetrating through at least a portion of the thickness of the substrate. A light absorbing material (e.g., a photoblocker) might be added to the polymerizable composition wherein the specific photoblocker is selected on the basis of the specific wavelength of radiation to be blocked, the extinction coefficient of the light absorbing material at the prescribed wavelength, and the absence of adverse photoreactions or adverse involvement in the polymerization reaction. One example of a photoblocker for use with an ultraviolet radiation source having a peak emission wavelength of 350 nm is 2,2'-dihydroxy-4,4'-dimethoxybenzophenone.

In some embodiments, polymerizable composition comprises a polymerizable species, photoinitiator and photoblocker.

In some embodiments, a source of ultraviolet radiation can be selected for delivering radiation to a coated porous substrate such that the irradiance delivered to the first major surface of the substrate is greater than the irradiance delivered at the second major surface. The irradiance can decrease as the radiation travels and is absorbed progressing through the thickness of the coated porous substrate. During exposure to the ultraviolet radiation source, polymerizable composition located at or near the first major surface receives a greater irradiance than polymerizable composition at or near the second major surface.

In one embodiment, the ultraviolet radiation source has a peak emission wavelength less than 340 nm.

The method of the present disclosure provides for a continuous process for forming rewettable asymmetrical membranes having a higher flux relative to rewettable symmetrical membranes of the same composition. The term "asymmetric" refers to a membrane in which the pore size and/or structure are not the same from one side of the membrane to the other side. Typically, the pores of the rewettable asymmetric membranes are partially filled (e.g., gel-filled) with polymerized material and a copolymer having both hydrophilic and hydrophobic groups. In the manufacture of the rewettable asymmetric membrane, a porous substrate is coated with polymerizable composition such that a copolymer and polymerizable species in the composition collect on the major surfaces and within the thickness of the porous substrate. The polymerizable composition can penetrate or saturate the thickness of the porous substrate, wetting the interstitial pores within. Irradiating one side of the coated porous substrate with an ultraviolet radiation source under an inert environment (e.g., substantially free of oxygen) results in a membrane having an asymmetrical distribution of polymerized material mixed with a copolymer and retained within the porous substrate. The resulting concentration of polymerized material is asymmetrically distributed through the thickness of the membrane with a higher concentration of polymerized material at or ear one side (e.g., at or near a first major surface) of the membrane and a lower concentration at or near the other side (e.g., at or near the second major surface) of the membrane. Copolymer collects on surfaces within the pores that are not occupied by the polymerized material. The remainder of the interstitial pores can be coated with the copolymer such that the second major surface is substantially free of the polymerized material. The process can be accomplished without the addition of 1) high concentrations of photoinitiator and/or 2) photoblockers, and without the application of long wavelength radiation sources. The rewettable asymmetric membranes formed herein exhibit high flux and good salt rejections.

Porous substrates generally have a network of interconnecting passages or pores extending from one surface to the other. These interconnecting passages provide a tortuous passageway through which liquids can pass during the process of being filtered.

In the method of the present disclosure, porous substrates generally have a first major surface, pores (e.g., interstitial), and a second major surface. Suitable substrates can be selected from a variety of materials so long as the porous substrate is coatable (e.g., capable of having a polymerizable composition applied to at least a portion of the thickness of the substrate) or can be adapted to be coatable, and comprises openings or pores. "First major surface" of the porous substrate refers to the surface typically closest in proximity to the ultraviolet radiation source. The "second major surface" refers to the surface of the substrate opposite the first major surface and is typically located at a distance furthest from the ultraviolet radiation source.

Suitable porous substrates include, for example, films, porous membranes, woven webs, nonwoven webs, hollow fibers, and the like The porous substrate can be formed from polymeric materials, ceramic materials, and the like, or combinations thereof. Some suitable polymeric materials include, for example, polyolefins, poly(isoprenes), poly(butadienes), fluorinated polymers, polyvinyl chlorides, polyesters, polyamides, polyimides, polyethers, poly(ether sulfones), poly (sulfones), poly(ether)sulfones, polyphenylene oxides, polyphenylene sulfides, poly(vinyl acetates), copolymers of vinyl acetate, poly (phosphazenes), poly(vinyl esters), poly (vinyl ethers), poly(vinyl alcohols), poly(carbonates) and the like, or combinations thereof. Suitable polyolefins include, for example, poly(ethylene), poly(propylene), poly(1-butene), copolymers of ethylene and propylene, alpha olefin copolymers (such as copolymers of 1-butene, 1-hexene, 1-octene, and 1-decene), poly(ethylene-co-1-butene), poly (ethylene-co-1-butene-co-1-hexene), and the like, or combinations thereof. Suitable fluorinated polymers include, for example, poly(vinyl fluoride), poly(vinylidene fluoride), copolymers of vinylidene fluoride (such as poly(vinylidene fluoride-co-hexafluoropropylene)), copolymers of chlorotrifluoroethylene (such as poly(ethylene-co-chlorotrifluoroethylene)), and the like, or combinations thereof. Suitable polyamides include, for example, poly(imino(1-oxohexamethylene)), poly(iminoadipoylimino hexamethylene), poly(iminoadipoyliminodecamethylene), polycaprolactam, and the like, or combinations thereof. Suitable polyimides include, for example, poly(pyromellitimide), and the like. Suitable poly(ether sulfone)s include, for example, poly(diphenylether sulfone), poly(diphenylsulfone-co-diphenylene oxide sulfone), and the like, or combinations thereof.

In some embodiments, the porous substrate can have an average pore size less than about 10 micrometers. In other embodiments, the average pore size of the porous substrate can be less than about 5 micrometers, less than about 2 micrometers, or less than about 1 micrometer. In other embodiments, the average pore size of the porous substrate can be greater than about 10 nanometers. In some embodiments, the average pore size of the porous substrate is greater than about 50 nanometers, greater than about 100 nanometers, or greater than about 200 nanometers. In some embodiments, the porous substrate can have an average pore size in a range of about 10 nanometers to about 10 micrometers, in a range of about 50 nanometers to about 5 micrometers, in a range of about 100 nanometers to about 2 micrometers, or in a range of about 200 nanometers to about 1 micrometer.

Some suitable porous substrates include, for example, nanoporous membranes, microporous membranes, microporous nonwoven webs, microporous woven webs, microporous fibers, and the like. In some embodiments, the porous substrate can have a combination of different pore sizes (e.g., micropores, nanopores, and the like). In one embodiment, the porous substrate is microporous. In some embodiments, the porous substrate can comprise a particulate or a plurality of particulates.

The thickness of the porous substrate selected can depend on the intended application of the membrane. Generally, the thickness of the porous substrate can be greater than about 10 micrometers. In some embodiments, the thickness of the porous substrate can be greater than about 1,000 micrometers, or greater than about 10,000 micrometers.

In some embodiments, the porous substrate is hydrophobic. In another embodiment, the porous substrate is hydrophilic. The porous substrate either being hydrophobic or hydrophilic can be coated with a polymerizable composition and exposed to an ultraviolet radiation source as described below.

In some embodiments, the porous substrate comprises a microporous, thermally-induced phase separation (TIPS) membrane. TIPS membranes can be prepared by forming a solution of a thermoplastic material and a second material above the melting point of the thermoplastic material. Upon cooling, the thermoplastic material crystallizes and phase separates from the second material. The crystallized material can be stretched. The second material can be optionally removed either before or after stretching. TIPS membranes are disclosed in U.S. Pat. No. 1,529,256 (Kelley); U.S. Pat. No. 4,726,989 (Mrozinski); U.S. Pat. No. 4,867,881 (Kinzer);

U.S. Pat. No. 5,120,594 (Mrozinski); U.S. Pat. No. 5,260,360 (Mrozinski); U.S. Pat. No. 5,962,544 (Waller, Jr.); and U.S. Pat. No. 4,539,256 (Shipman). In some embodiments, TIPS membranes comprise polymeric materials such as poly(vinylidene fluoride) (i.e., PVDF), polyolefins such as poly(ethylene) or poly(propylene), vinyl-containing polymers or copolymers such as ethylene-vinyl alcohol copolymers and butadiene-containing polymers or copolymers, and acrylate-containing polymers or copolymers. TIPS membranes comprising PVDF are further described in U.S. Patent Application Publication No. 2005/0058821 (Smith et al.)

In some embodiments, the porous substrate can be a nonwoven web having an average pore size that is typically greater than about 10 micrometers. Suitable nonwoven webs include, for example, melt-blown microfiber nonwoven webs described in Wente, V. A., "Superfine Thermoplastic Fibers"; *Industrial Engineering Chemistry*, 48, 1342-1346 (1956), and Wente, V. A., "Manufacture of Super Fine Organic Fibers"; *Naval Research Laboratories* (Report No. 4364) May 25, 1954. In some embodiments, suitable nonwoven webs can be prepared from nylon.

Some examples of suitable porous substrates include commercially available materials such as hydrophilic and hydrophobic microporous membranes known under the trade designations DURAPORE and MILLIPORE EXPRESS MEMBRANE, available from Millipore Corporation of Billerica, Mass. Other suitable commercial microporous membranes known under the trade designations NYLAFLO and SUPOR are available from Pall Corporation of East Hills, New York.

In the method of the present disclosure, a polymerizable species is applied to the porous substrate. The term "polymerizable composition" generally refers to compositions having at least one polymerizable species, at least one copolymer comprising hydrophilic and hydrophobic groups, a solvent, and at least one photoinitiator. The polymerizable species can be polymerized on the first major surface, within the pores or at least a portion of the pores, or on the second major surface of the porous substrate when exposed to an ultraviolet radiation source. The copolymer comprising hydrophilic and hydrophobic groups can coat the interstitial pores of the porous substrate. The copolymer can reside with the polymerized material throughout a portion of the thickness of the substrate. The copolymer can collect on the remainder of the interstitial pores where the concentration of the polymerized material is negligible. The second major surface is substantially free of the polymerized material. The solvent is selected to dissolve, suspend, or disperse the polymerizable species, the copolymer, and the photoinitiator or combinations thereof of the polymerizable composition.

The photoinitator can be selected for initiating the polymerization of the polymeric species and can selectively absorb radiation from ultraviolet radiation sources. In some embodiments, the polymerizable composition applied to the porous substrate doesn't require a photoinitiator as described in U.S. Pat. No. 5,891,530 (Wright).

The polymerizable composition can be applied to at least a portion of the thickness of the porous substrate. The polymerizable composition, after exposure to the ultraviolet radiation source, can form polymerized material extending through at least a portion of the thickness of the porous substrate. The resulting polymerized material together with the copolymer can reside on the first major surface and within the porous substrate by chemical or physical interactions. The second major surface can be coated with the copolymer and be substantially free of the polymerized material. In some embodiments, the polymerized material and/or copolymer can graft onto the surfaces of the porous substrate. In another embodiment, the polymerized material and/or copolymer reside within and on the surfaces of the interstitial pores of the porous substrate through hydrogen bonding, Van der Waals interactions, ionic bonding, and the like.

The photoinitiator of the polymerizable composition can initiate polymerization of the polymerizable species. The polymerizable composition can comprise about 0.001 to about 5.0 weight percent photoinitiator. Some suitable photoinitiators can include, for example, organic compounds, organometallic compounds, inorganic compounds, and the like. Some examples of free radical photoinitiators include, for example, benzoin and its derivatives, benzyl ketals, acetophenone, acetophenone derivatives, benzophenone, and benzophenone derivatives, acyl phosphine oxides, and the like, or combinations thereof. In some embodiments, some photoinitiators (e.g., acyl phosphine oxides) can absorb long wavelength ultraviolet radiation, short wavelength ultraviolet radiation, and the like or combinations thereof.

Exemplary photoinitiators for initiating free-radical polymerization of (meth)acrylates, for example, include benzoin and its derivatives such as alpha-methylbenzoin; alpha-phenylbenzoin; alpha-allylbenzoin; alpha-benzylbenzoin; benzoin ethers such as benzil dimethyl ketal (available, for example, under the trade designation IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available, for example, under the trade designation DAROCUR 1173 from Ciba Specialty Chemicals) and 1-hydroxycyclohexyl phenyl ketone (available, for example, under the trade designation IRGACURE 184 from Ciba Specialty Chemicals); 2-methyl-1-[4-(methylthio)phenyl]-2-(4-morpholinyl)-1-propanone (available, for example, under the trade designation IRGACURE 907 from Ciba Specialty Chemicals); 2-benzyl-2-(dimethylamino)-1-[4-(4-morpholinyl)phenyl]-1-butanone (available, for example, as IRGACURE 369 from Ciba Specialty Chemicals). Other useful photoinitiators include pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinone-halomethyltriazines; benzophenone and its derivatives; iodonium salts and sulfonium salts as described hereinabove; titanium complexes such as bis(eta$_5$-2,4-cyclopentadien-1-yl)bis[2,6-difluoro-3-(1H-pyrrol-1-yl)phenyl]titanium (obtained under the trade designation CGI 784 DC, also from Ciba Specialty Chemicals); halomethylnitrobenzenes such as, for example, 4-bromomethylnitrobenzene; mono- and bis-acylphosphines (available, for example, from Ciba Specialty Chemicals as IRGACURE 1700, IRGACURE 1800, IRGACURE 1850, and DAROCUR 4265).

The photoinitiator of the polymerizable composition is selected to initiate polymerization of polymerizable species throughout at least a portion of the thickness of the porous substrate. The thickness of the porous substrate extends from the first major surface to the second major surface. The photoinitiator can initiate polymerization of the polymerizable species upon exposure to the ultraviolet radiation source at the first major surface, and can extend through a portion of the thickness of the porous substrate. The initiation of polymerizable species for forming polymerized material can decrease through the thickness to the second major surface.

Polymerizable species (e.g., monomers) of the polymerizable composition can polymerize by many polymerization routes. In particular, the polymerizable species can attach to reactive groups or polymerizable species on the substrate by chemical bonding (e.g., free radical reaction) to form a covalent bond. The resulting surface properties of the rewettable asymmetric membrane are typically different than the surface properties of the initial porous substrate. For example, the addition of polymerized material and a copolymer to the porous substrate provides for reactive surfaces when contacted by other species, for example, by interactions including hydrogen bonding, Van der Waals interactions, ionic bonding, and the like.

In some embodiments, the polymerizable species of the polymerizable composition is a monomer having a free-radically polymerizable group. In some embodiments, the polymerizable species may comprise a free-radically polymerizable group and an additional functional group thereon. The free-radically polymerizable group can be an ethylenically unsaturated group such as a (meth)acryloyl group, an acryoyl group, or a vinyl group. The free-radically polymerizable group, after initiation by a photoinitiator, can polymerize within the porous substrate forming a polymerized material upon exposure to the ultraviolet radiation source. The reaction of the free-radically polymerizable groups of the polymerizable species with other reactive groups or polymerizable species of the porous substrate upon exposure to ultraviolet radiation can result in the formation of a greater concentration of the polymerized material at the first major surface and within the openings or pores nearest the first major surface than at the second major surface of the rewettable asymmetric membrane.

In addition to having a free-radically polymerizable group, polymerizable species can contain a second or additional functional group. In some embodiments, the second functional group is selected from a second ethylenically unsaturated group, ring opening groups (e.g., epoxy group, an azlactone group, and an aziridine group), an isocyanato group, an ionic group, an alkylene oxide group, or combinations thereof. The second or additional functional group of the polymerizable species can provide for further reactivity or affinity of the polymerized material retained within the porous substrate. In some embodiments, the additional functional group can react to form a linking group between the porous substrate and other material such as other species or nucleophilic compounds having at least one nucleophilic group.

The presence of an additional functional group can impart a desired surface property to the rewettable asymmetric membrane such as an affinity for a particular type of compound. In some embodiments, the polymerizable species can contains an ionic group such that the rewettable asymmetric membrane containing polymerized material and a copolymer can often have an affinity for compounds having an opposite charge. That is, compounds with negatively charged groups can be attracted to the rewettable asymmetric membrane having polymerized material with a cationic group and compounds with positively charged groups can be attracted to a the rewettable asymmetric membrane having polymerized material with an anionic group. Further, the polymerized material can modify the hydrophobic character of the initial substrate and impart a hydrophilic property to at least one major surface of the rewettable asymmetric membrane. In one embodiment, the polymerized material containing an alkylene oxide group can impart hydrophilic character to the rewettable asymmetric membrane.

In still other embodiments, suitable polymerizable species of the polymerizable composition can have a free-radically polymerizable group that is an ethylenically unsaturated group and an additional functional group that is an ionic group. The ionic group can have a positive charge, a negative charge, or a combination thereof. With some suitable ionic species, the ionic group can be neutral or charged depending on the pH conditions. This class of species is typically used to impart a desired surface affinity for one or more oppositely charged compounds or to decrease the affinity for one or more similarly charged compounds.

In still other embodiments, suitable ionic polymerizable species having a negative charge include (meth)acrylamidosulfonic acids of Formula I or salts thereof

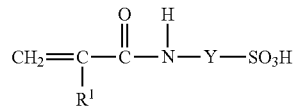

In Formula I, $R^1$ is hydrogen or methyl; and Y is a straight or branched alkylene (e.g., alkylenes having 1 to 10 carbon atoms, 1 to 6 carbon atoms, or 1 to 4 carbon atoms). Exemplary ionic species according to Formula I include, but are not limited to, N-acrylamidomethanesulfonic acid, 2-acrylamidoethanesulfonic acid, 2-acrylamido-2-methyl-1-propanesulfonic acid, and 2-methacrylamido-2-methyl-1-propanesulfonic acid. Salts of these acidic species can also be used. Counter ions for the salts can be, for example, ammonium ions, potassium ions, lithium ions, or sodium ions.

Other suitable ionic polymerizable species having a negative charge include sulfonic acids such as vinylsulfonic acid and 4-styrenesulfonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable acidic species include (meth)acryloylamino as described in U.S. Pat. No. 4,157,418 (Heilmann et al). Exemplary (meth)acryloylamino acids include, but are not limited to, N-acryloylglycine, N-acryloylaspartic acid, N-acryloyl-β-alanine, and 2-acrylamidoglycolic acid. Salts of any of these acidic species can also be used.

Other ionic polymerizable species that are capable of providing a positive charge are amino (meth)acrylates or amino (meth)acrylamides of Formula II or quaternary ammonium salts thereof. The counter ions of the quaternary ammonium salts are often halides, sulfates, phosphates, nitrates, and the like.

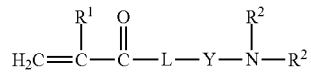

In Formula II, $R^1$ is hydrogen or methyl; L is oxy or —NH—; and Y is an alkylene (e.g., an alkylene having 1 to 10 carbon atoms, 1 to 6, or 1 to 4 carbon atoms). Each $R^2$ is independently hydrogen, alkyl, hydroxyalkyl (i.e., an alkyl substituted with a hydroxy), or aminoalkyl (i.e., an alkyl substituted with an amino). Alternatively, the two $R^2$ groups taken together with the nitrogen atom to which they are attached can form a heterocyclic group that is aromatic, partially unsaturated (i.e., unsaturated but not aromatic), or saturated, wherein the heterocyclic group can optionally be fused to a second ring that is aromatic (e.g., benzene), partially unsaturated (e.g., cyclohexene), or saturated (e.g., cyclohexane).

In some embodiments of Formula II, both $R^2$ groups are hydrogen. In other embodiments, one $R^2$ group is hydrogen and the other is an alkyl having 1 to 10, 1 to 6, or 1 to 4 carbon atoms. In still other embodiments, at least one of $R^2$ groups is a hydroxy alkyl or an amino alkyl that have 1 to 10, 1 to 6, or 1 to 4 carbon atoms with the hydroxy or amino group being positioned on any of the carbon atoms of the alkyl group. In yet other embodiments, the $R^2$ groups combine with the nitrogen atom to which they are attached to form a heterocyclic group. The heterocyclic group includes at least one nitrogen atom and can contain other heteroatoms such as oxygen or sulfur. Exemplary heterocyclic groups include, but are not limited to imidazolyl. The heterocyclic group can be fused to an additional ring such as a benzene, cyclohexene, or cyclohexane. Exemplary heterocyclic groups fused to an additional ring include, but are not limited to, benzoimidazolyl.

Exemplary amino (meth)acrylates (i.e., L in Formula II is oxy) include, for example, N,N-dialkylaminoalkyl(meth) acrylates such as, for example, N,N-dimethylaminoethylmethacrylate, N,N-dimethylaminoethylacrylate, N,N-diethylaminoethylmethacylate, N,N-diethylaminoethylacrylate, N,N-dimethylaminopropylmethacrylate, N,N-dimethylaminopropylacrylate, N-tert-butylaminopropylmethacrylate, N-tert-butylaminopropylacrylate and the like.

Exemplary amino (meth)acrylamides (i.e., L in Formula II is —NH—) include, for example, N-(3-aminopropyl)methacrylamide, N-(3-aminopropyl)acrylamide, N-[3-(dimethylamino)propyl]methacrylamide, N-(3-imidazolylpropyl) methacrylamide, N-(3-imidazolylpropyl)acrylamide, N-(2-imidazolylethyl)methacrylamide, N-(1,1-dimethyl-3-imidazoylpropyl)methacrylamide, N-(1,1-dimethyl-3-imidazoylpropyl)acrylamide, N-(3-benzoimidazolylpropyl) acrylamide, and N-(3-benzoimidazolylpropyl) methacrylamide.

Exemplary quaternary salts of the ionic species of Formula II include, but are not limited to, (meth)acrylamidoalkyltrimethylammonium salts (e.g., 3-methacrylamidopropyltrimethylammonium chloride and 3-acrylamidopropyltrimethylammonium chloride) and (meth) acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other polymerizable species can be selected from those known to provide positively charged groups, for example, to an ion exchange resin. Such polymerizable species include, for example, the dialkylaminoalkylamine adducts of alkenylazlactones (e.g., 2-(diethylamino)ethylamine, (2-aminoethyl)trimethylammonium chloride, and 3-(dimethylamino) propylamine adducts of vinyldimethylazlactone) and diallylamine species (e.g., diallylammonium chloride and diallyldimethylammonium chloride).

In some methods for making a rewettable asymmetric membrane, suitable polymerizable species can have two free-radically polymerizable groups as well as a hydrophilic group. For example, alkylene glycol di(meth)acrylates can be used as polymerizable species to impart hydrophilic character to a hydrophobic porous substrate. These polymerizable species have two (meth)acryloyl groups and a hydrophilic polyalkylene glycol (i.e., polyalkylene oxide) group.

When the membrane has polymerizable species that contains an epoxy group, an azlactone group, or an isocyanato group, the rewettable asymmetric membrane can be further treated such that the functional groups can react with a nucleophilic compound having a one or a plurality of nucleophilic groups to impart a hydrophilic character to a hydrophobic porous substrate. Unreacted nucleophilic groups can contribute to forming a hydrophilic functionalized membrane. Some exemplary nucleophilic compounds contain a hydrophilic group such as a polyalkylene oxide group in addition to the nucleophilic group. For example, the nucleophilic compound such as polyalkylene glycol diamines and polyalkylene glycol triamines can include a plurality of amino groups.

Polymerizable compositions of the present disclosure can be prepared, for example, as a coatable solution, dispersion, emulsion, or the like. The polymerizable compositions can be applied to the first major surface, interstitial pores, and the second major surface of the porous substrate. In some examples, the porous substrate can be saturated or immersed with a polymerizable composition comprising at least one polymerizable species, at least one copolymer comprising hydrophilic and/or hydrophobic groups, at least one solvent and at least one photoinitiator. The concentration of the polymerizable species, for example, can vary depending on a number of factors including, but not limited to, the polymerizable species, the copolymer, the extent of polymerization or crosslinking of the polymerizable species on and within the porous substrate, the reactivity of the polymerizable species, the crosslinker concentration, or the solvent used. In some embodiments, the concentration of the polymerizable species of the polymerizable composition can be in a range of about 2 weight percent to about 99.9 weight percent.

In one embodiment, the porous substrate can have a hydrophilic surface prior to contacting the polymerizable composition. After contacting the polymerizable composition with an ultraviolet radiation source, the hydrophobic surface can impart a hydrophobic property to at least one surface of the rewettable asymmetric membrane.

In some embodiments, the polymerizable species of the polymerizable composition have a free-radically polymerizable group that is a first ethylenically unsaturated group and a second functional group that is a second ethylenically unsaturated group. In one embodiment, the polymerizable composition includes a crosslinker suitable for crosslinking the polymerizable species forming a network or gelled polymerized material. Suitable polymerizable species having two ethylenically unsaturated groups include, but are not limited to, polyalkylene glycol di(meth)acrylates. The term polyalkylene glycol di(meth)acrylate is used interchangeably with the term polyalkylene oxide di(meth)acrylate. The term "(meth) acryl" as in (meth)acrylate is used to encompass both acryl groups as in acrylates and methacryl groups as in methacrylates. Exemplary polyalkylene glycol di(meth)acrylates include polyethylene glycol di(meth)acrylate species and polypropylene glycol di(meth)acrylate species. Polyethylene glycol diacrylate species having an average molecular weight of about 400 g/mole is commercially available, for example, under the trade designation SR344 and polyethylene glycol dimethacrylate species having an average molecular weight of about 400 g/mole is commercially available under the trade designation SR603 from Sartomer Company, Incorporated of Exton, Pennsylvania.

In some embodiments, suitable polymerizable species have a free-radically polymerizable group that is a first ethylenically unsaturated group and an additional functional group that is an epoxy group. Suitable polymerizable species within this class include, but are not limited to, glycidyl (meth)acrylates. This class of polymerizable species can provide a functionalized rewettable asymmetric membrane having at least one epoxy group available for further reactivity. The epoxy group can react with other reactants such as with another species or with a nucleophilic compound to impart a desired surface property to the porous substrate (e.g., affinity for a particular compound or functional group having different reactivity). The reaction of the epoxy group with a nucleophilic compound, for example, results in the opening of the epoxy ring and the formation of a linkage group that functions to tether the nucleophilic compound to the porous substrate. Suitable nucleophilic groups for reacting with epoxy groups include, but are not limited to, primary amino groups, secondary amino groups, and carboxy groups. The nucleophilic compound can contain more than one nucleophilic group that can crosslink multiple epoxy groups or more than one optional groups that can impart hydrophilic character to the functionalized membrane. The linkage group formed by ring-opening of the epoxy group often contains the group —C(OH)HCH$_2$NH— when the epoxy is reacted with a primary amino group or —C(OH)HCH$_2$O(CO)— when the epoxy is reacted with a carboxy group.

In some instances, the epoxy groups of the polymerized material within the porous substrate can be reacted with a multifunctional amine such as a diamine having two primary amino groups or a triamine having three primary amino groups. One of the amino groups can undergo a ring opening reaction with the epoxy group and result in the formation of a linkage group that contains the group —C(OH)HCH$_2$NH— between the nucleophilic compound and the porous substrate. The second amino group or the second and third amino groups can impart a hydrophilic character to the rewettable asymmetric membrane or can crosslink two or more polymerizable species by reacting with one or more additional epoxy groups. In some examples, the multifunctional amine is a polyalkylene glycol diamine or polyalkylene glycol triamine and reaction with an epoxy group results in the attachment of a polymerized material having a polyalkylene glycol group (i.e., polyalkylene oxide group). The polyalkylene glycol group as well as any terminal primary amino group tends to impart hydrophilic character to the rewettable asymmetric membrane.

In still other embodiments, suitable polymerizable species have a free-radically polymerizable group that is an ethylenically unsaturated group and an additional functional group that is an azlactone group. Suitable polymerizable species include, but are not limited to, vinyl azlactone such as 2-vinyl-4,4-dimethylazlactone. This class of polymerizable species can provide a rewettable asymmetric membrane having at least one azlactone group available for further reactivity. The azlactone group can react with other reactants such as another species or with a nucleophilic compound to impart a desired surface property to the porous substrate (e.g., affinity for a particular compound or functional group having different reactivity). The reaction of the azlactone group with a nucleophilic compound, for example, results in the opening of the azlactone ring and the formation of a linkage group that functions to attach the nucleophilic compound to the porous substrate. The nucleophilic compound typically contains at least one nucleophilic group. Suitable nucleophilic groups for reacting with an azlactone group include, but are not limited to, primary amino groups, secondary amino groups and hydroxy groups. The nucleophilic compound can contain additional nucleophilic groups that can crosslink multiple azlactone groups or can contain other optional groups that can impart a hydrophilic character to the rewettable asymmetric membrane. The linkage group formed by ring-opening of the azlactone group often contains the group —(CO)NHCR$_2$(CO)— where R is an alkyl such as methyl and (CO) denotes a carbonyl.

In some instances, the azlactone groups can be reacted with a multifunctional amine such as a diamine having two primary amino groups or a triamine having three primary amino groups. One of the amino groups can undergo a ring opening reaction with the azlactone group and result in the formation of a linkage containing the group —(CO)NHCR$_2$(CO)— between the nucleophilic compound and the porous substrate. The second amino group or second and third amino groups can impart a hydrophilic character to the rewettable asymmetric membrane or can crosslink multiple polymerizable species. In some examples, the multifunctional amine is a polyalkylene glycol diamine or a polyalkylene glycol triamine and reaction with an azlactone group results in the attachment of a polymerizable species having a polyalkylene glycol group (i.e., polyalkylene oxide group). The polyalkylene glycol group as well as any terminal primary amino group tends to impart a hydrophilic character to the rewettable asymmetric membrane.

In still other embodiments, suitable polymerizable species can have a free-radically polymerizable group that is an ethylenically unsaturated group and an additional functional group that is an isocyanato group. Some suitable polymerizable species include, but are not limited to an isocyanatoalkyl (meth)acrylate such as 2-isocyanatoethyl methacrylate and 2-isocyanatoethyl acrylate. This class of polymerizable species can provide the rewettable asymmetric membrane having at least one reactive isocyanato group. The isocyanato group can react with other reactants such as another species or with a nucleophilic compound to impart a desired surface property to the rewettable asymmetric membrane (e.g., affinity for a particular compound or functional group having different reactivity). The reaction of an isocyanato group with a nucleophilic compound can result in the formation of a urea linkage if the nucleophilic group is a primary amino or secondary amino group or in the formation of a urethane linkage if the nucleophilic group is a hydroxy group. The nucleophilic compound can contain additional nucleophilic groups that can crosslink multiple isocyanato groups or can contain other optional groups that can impart a hydrophilic character to the rewettable asymmetric membrane. The linkage group formed by reaction of a nucleophilic compound with an isocyanato group often contains the group —NH(CO)NH— when the nucleophilic group is a primary amino group or —NH(CO)O— when the nucleophilic group is a hydroxy.

Copolymers of the polymerizable composition can coat the interstitial pores, the first major surface and the second major surface of the porous substrate. The copolymer is combined with the polymerized material to coat the interstitial pores and to collect on the remainder of the interstitial pores of the porous substrate of the rewettable asymmetric membrane. In some embodiments, a mixture of the copolymer with the polymerized material resides within the interstitial pores. In some embodiments, the copolymer can coat or collect on the interstitial pores such that the polymerized material has the copolymer coated between the polymerized material and the porous substrate.

Copolymers useful for forming the rewettable asymmetric membrane have hydrophilic and hydrophobic groups which include copolymers which are generally water-swellable, water insoluble, and can provide for a durable coating on the porous substrate. Some examples of copolymers having these groups can include, for example, cellulose derivatives such as cellulose acetate, cellulose acetate butyrate, cellulose acetate propionate, 2-hydroxyethyl cellulose, and ethyl cellulose;

polyesters such as poly(ethylene adipate), polyethylene glycol terephthalate, poly(L-lactide), poly(DL-lactide) and poly(DL-Lactide-co-glycolide); polyamides such as poly(hexamethyleneadipamide) and poly(hexamethylenesebacamide; polyacrylates such as poly(2-hydroxyethyl methacrylate) and poly(2-hydroxyporpyl methacrylate); ethylene-vinyl alcohol copolymers; poly(ethylene-co-allyl alcohol); polyhydroxystyrene; and poly(vinyl alcohol). Further examples of copolymers of the polymerizable composition can include water insoluble charged copolymers including, for example, sulfonated poly(ether-ether-ketone) ((S-PEEK), having a sulfonation less than 86%); sulfonated poly(phenylene oxide) ((S—PPO), having a sulfonation less than 70%), sulfonated poly(ether)sulfone, and sulfonated polystyrene. Examples further include aminated polysulfone, aminated poly(phenylene oxide), aminated poly(vinylbenzyl chloride), partially protonated or alkylated poly(4-vinylpyridine). Neutral and ionically charged random and block copolymers are other examples of suitable copolymers.

Some hydrophobic monomers can be polymerized with other hydrophobic monomers for forming copolymers useful in the present disclosure. In some embodiments, more than one hydrophobic monomer can be polymerized with more than one hydrophilic monomer, and the like. Examples of hydrophobic monomers can include, for example, methyl methacrylate (MMA); iso-, sec-, tert- or n-propyl (meth)acrylate; iso-, sec-, tert- or n-butyl (meth)acrylate; n-hexyl acrylate; n-heptyl methacrylate; 1-hexadecyl methacrylate; n-myristyl acrylate; n-octyl methacrylate; stearyl acrylate; 3,3,5-trimethylcyclohexyl methacrylate; and undecyl (meth) acrylate. Further hydrophobic monomers can include vinyl laurate; vinyl stearate; tert-amyl methacrylate; cyclohexyl (meth)acrylate; n- or iso-decyl meth(acrylate); di(n-butyl) itaconate; n-dodecyl methacrylate; 2-ethylbutyl methacrylate; 2-ethylhexyl acrylate; isooctyl acrylate; isotridecylacrylate; isobornyl acrylate; vinyl butyrate; N-ethyl methacrylamide; N-tert-butylacrylamide; N-(n-octadecyl)acrylamide; N-tert-octylacrylamide N-benzylmethacrylamide; N-cyclohexylacrylamide; N-diphenylmethylacrylamide; N-dodecylmethacrylamide; styrene; 2-, 3-, or 4-methylstyrene; vinyl octadecylether; and vinyl iso-octyl ether, and the like. Some examples of hydrophilic monomers can include 4-hydroxybutyl methacrylate; 2-hydroxyethyl (meth)acrylate; hydroxypropyl (meth)acrylate; poly(ethylene glycol) mono (meth)acylates; poly(propylene glycol) mono (meth)acrylates; glycerol mono(meth)acrylate; 2-(2-ethoxyethoxy) ethyl acrylate; tetrahydrofurfuryl acrylate; N-acryloyltri(hydroxymethyl)methylamine; monoacrylkoxyethyl phosphate; 1,1,1-trimethylolporpane diallyl ether; 1,1,1-trimethlolpropane diallyl ether; 1,1,1-trimethylolpropane monoallyl ether; vinyl-4-hydroxybutylether; (meth)acrylamide; n-isopropyl acrylamide; N-vinylformamide; N-vinyl-N-methacetamide; N-(2-hydroxypropyl)methacrylamide; N,N-diethyl(meth) acrylamide; N,N-dimethyl (meth)acrylamide; N-methylmethacrylamide; N-methlolacrylamide; N-vinyl-2-pyrrolidone; N-vinylcaprolactam; vinyl methylsulfone; N-vinylurea; and N-(meth)acryloylmorpholine.

Some examples of charged monomers useful for forming copolymers include, for example, 2-acrylamido-2-methyl-propanesulfonic acid (AMPS) and salt forms; sodium sulfonate; vinylsulfonic acid; acrylamidoglycolic acid; (meth) acrylic acid; itaconic acid; 2-propene-s-sulfonic acid sodium acrylate; 2-sulfonethyl (meth)acrylate; 3-sulfopropyl (meth) acrylate; vinylbenzioic acid; vinylsulfonic acid; 2-carboxyethyl acrylate; (Meth)acrylamidopropyltrimethylammonium chloride (MAPTAC/APTAC); 2-methacryloxyethyltrimethylammonium chloride; methacryloylchloine methyl sulphate; 2-N-morpholinoethyl acrylate; 2-N-morpholinoethyl methacrylate; 1-vinylimidazole, 2- or 4-vinylpyridine; 2-acryloxyethyltrimethylammonium chloride; 2-aminoethyl methacrylate hydrochloride; N-(tert-butylamino)ethyl methacrylate; diallylamine; diallyldimethylammonium chloride; 2-(N,N-diethylamino) ethyl methacrylate; 2-(diethylamino) ethylstyrene; 2-(N,N-dimethylamino)ethyl acrylate; N-[2-(N,N-dimethylamino)ethyl]methacrylamide; 2-(N,N-dimethylamino)ethyl and methacrylate; N-[2-(N,N-dimethylamino)propyl](meth)acrylamide.

In some embodiments, copolymers can contain functional groups such that the crosslinking or other chemical reactions can occur. Some examples of reactive monomers for copolymers can include, for example, methacrylic anhydride, vinyl azlactone, acrylic anhydride, allyl glycidyl ether, allylsuccinic anhydride, 2-cinnamoyloxyethyl (meth)acrylate, cinnamyl (meth)acrylate, citraconic anhydride, and glycidyl acrylate, Some examples of random copolymers having hydrophilic and hydrophobic monomers include, poly(AMPS-co-N-t-butylacrylamide), poly(APTAC-co-N-t-butylacrylamide), poly(N-vinylformamide-co-N-t-butylacrylamide), and poly(AMPS-co-MMA), and the like.

Copolymers having hydrophilic and hydrophobic groups are commercially available. The groups of the copolymer can be chemically or physically modified to form the hydrophilic or hydrophobic block of the copolymer prior to or after application to the porous substrate. The copolymer can be dissolved, dispersed, or suspended in the polymerizable composition.

In some embodiments, the hydrophobic block can be a polyolefin and the hydrophilic block can be a polyacetate. In a preferred embodiment, the copolymer can be an ethylene-vinyl alcohol copolymer. The hydrophilic block of the ethylene-vinyl alcohol copolymer can be chemically modified.

Ethylene-vinyl alcohol copolymers are generally formed from ethylene-vinyl acetate copolymers after saponification. The ethylene-vinyl acetate copolymer comprises ethylene and vinyl acetate monomers. After saponification of the ethylene-vinyl acetate copolymer, the vinyl acetate units can be chemically modified to vinyl alcohol units. Other monomer components can also be present in the saponified ethylene-vinyl acetate copolymer in such amounts not to impair the hydrophilicity of the hydrophilic membrane. The ethylene-vinyl alcohol copolymer can be of various types including, for example, random copolymers, block copolymers, graft copolymers, and the like, or combinations thereof. Similarly, the selection of ethylene-vinyl alcohol copolymer can depend on the structure and molecular weight of the ethylene-vinyl acetate copolymer formed prior to saponification.

In some embodiments, the polymerizable composition comprising a copolymer further comprises a solvent. The solvent can comprise a liquid suitable for dissolving, dispersing or suspending the polymerizable species and/or copolymer of the polymerizable composition.

In one embodiment, the copolymer can be dissolved in the polymerizable species.

In another embodiment, the copolymer is an ethylene-vinyl alcohol copolymer. The solvent for the ethylene-vinyl alcohol copolymer can be a combination of water and an organic liquid. The organic liquid selected can be miscible with water.

In one embodiment further comprising a solvent, some or substantially most of the solvent can be removed from the porous substrate. As the solvent is removed from the porous membrane, the copolymer can coat at least a portion of the surface and the pores of the porous substrate. In some embodiments, at least 50 weight percent of the organic solvent can be removed. In another embodiment, at least 60 weight percent, at least 70 weight percent, at least 80 weight percent, or at least 90 weight percent of the organic solvent can be removed from the porous substrate. After removing the solvent, for example, by evaporation, the rewettable asymmetric membrane can be washed with a solvent, and further dried.

In another embodiment, the rewettable asymmetric membrane after exposure to ultraviolet radiation can be exposed to a nonsolvent so that the copolymer can collect on the interstitial pores of the membrane. In one embodiment, the copolymer is the ethylene-vinyl alcohol copolymer. The rewettable asymmetric membrane after irradiation by the UV radiation source can be immersed in a nonsolvent such as water (e.g., water bath). The water as a nonsolvent can cause a portion of the ethylene-vinyl alcohol copolymer of the porous substrate to collect on the interstitial pores of the porous substrate. After exposure to the nonsolvent and collection of the ethylene-vinyl alcohol copolymer on the porous substrate, the rewettable asymmetric membrane can be dried.

In some embodiments, the polymerizable composition can further include a crosslinker. Suitable crosslinkers can include difunctional and polyfunctional acrylate and methacrylate free radically polymerizable monomers. Some examples of crosslinkers can include, for example, ester derivatives of alkyl diols, triols, and tetrols (e.g., 1,4-butanediol diacrylate, 1,6-hexanediol diacrylate, trimethylolpropane triacrylate, and pentaerythritol triacrylate). Some other difunctional and polyfunctional acrylate and methacrylate monomers have been described in U.S. Pat. No. 4,379,201 (Heilmann et al.). In some embodiments, difunctional and polyfunctional acrylate monomers include, for example 1,2-ethanediol diacrylate, 1,12-dodecanediol diacrylate, pentaerythritol tetracrylate, and the like, or combinations thereof. Difunctional and polyfunctional acrylates and methacrylates can include acrylated epoxy oligomers, acrylated aliphatic urethane oligomers, acrylated polyether oligomers, and acrylated polyester oligomers such as those commercially available under the trade designation EBECRYL from CYTEC SURFACE SPECIALTIES of Smyrna, Georgia. Examples of other commercially available monomers as described above are available from Sartomer of Exton, Pennsylvania.

The polymerizable composition is applied to the porous substrate so as to coat, soak, wet, or immerse the porous substrate to provide a coated porous substrate. The polymerizable composition can be applied to the porous substrate having a thickness extending from a first major surface to a second major surface of the porous substrate. The polymerizable composition can be applied to the porous substrate to wet or penetrate into at least one micrometer of the thickness extending from the first major surface. In some embodiments, the polymerizable composition can wet or penetrate through the entire thickness of the porous substrate. In some embodiments, the porous substrate can be immersed with the polymerizable composition.

In some embodiments, the polymerizable composition can wet the surfaces of the pores throughout the thickness of the porous substrate to include wetting the first and second major surfaces. Suitable methods for applying the polymerizable composition to the porous substrate include, for example, saturation or immersion techniques, spray coating, curtain coating, slide coating, flood coating, die coating, roll coating, deposition, or by other known coating or application methods. The polymerizable composition to be applied to the porous substrate generally has a viscosity such that the first major surface, the second major surface and the pores of the porous substrate can be coated. The viscosity of the polymerizable composition can be altered dependent on the application method and the porous substrate chosen to receive the polymerizable composition.

The coated porous substrate is exposed to an ultraviolet radiation source to initiate and polymerize and/or crosslink the polymerizable composition. The ultraviolet radiation source selected for forming rewettable asymmetric membranes can depend on the intended processing conditions, and the appropriate energy source required for activating the photoinitiator present in the polymerizable composition for providing a gradient concentration of polymerized material through the thickness of the porous substrate. Other considerations for selecting the ultraviolet radiation source can include the amount and type of polymerizable species, crosslinker, and related materials (e.g., copolymer) present in the polymerizable composition, the desired speed of the coated porous substrate as it moves past the ultraviolet source in a continuous manufacturing process, the distance of the porous substrate from the ultraviolet radiation source, and the thickness of the porous substrate.

A variety of ultraviolet (UV) radiation sources can be used to prepare the rewettable asymmetric membranes of the present disclosure. Suitable sources include low, medium- and high-pressure mercury arc lamps, electrodeless mercury lamps, light emitting diodes, mercury-xenon lamps, lasers and the like. Available ultraviolet radiation sources can be broadband, narrowband or monochromatic. When broadband ultraviolet radiation sources are used, filters can be applied to narrow the spectral output to a specific spectral region, thus eliminating certain wavelengths that can be detrimental to the rewettable asymmetric membrane forming process. Suitable ultraviolet radiation sources are not restricted by power and can be pulsed or continuous sources. Some of these radiation sources may or may not contain mercury. Preferred ultraviolet radiation sources can be those that have relatively low IR (infrared) emissions that generally require no special cooling requirements. Dichroic reflectors (cold mirrors) and/or dichroic front windows (hot mirrors), and/or water jackets and other methods know to those skilled in the art can be used to help control the IR emissions from the ultraviolet radiation source.

In one embodiment, the UV radiation source has a peak emission wavelength less than 340 nm. In another embodiment, the UV radiation source is a narrow bandwidth source.

In some embodiments, narrow bandwidth UV sources can be selected for which the UV radiation output spans a range of no more than about 50-100 nm. One example of a narrow bandwidth UV radiation source includes, for example, fluorescent ultraviolet lamps, which can operate without special filters and have low IR emissions. In a preferred embodiment, monochromatic or substantially monochromatic UV radiation sources such as excimer lamps, lasers, light emitting diodes, and germicidal lamps are used. These sources have greater than 95% of their spectral output confined to a region spanning no more than about 20-30 nm. Some examples of excimer lamps include a XeCl excimer lamp having a peak emission at 308 nm, a KrCl excimer lamp having a peak emission at 222 nm, a $Xe_2$ excimer lamp having a peak emission at 172 nm and a germicidal lamp having a peak emission at 254 nm. Substantially monochromatic lamps providing UV radiation output within a narrow spectral range and having low IR output are generally preferred. These lamps can allow for more control in forming a gradient of polymerized material within the copolymer retained within a rewettable asymmetric membrane and are commercially available. Such sources are well known in the art. An ultraviolet radiation source can be a single source or a plurality of sources. Similarly, the plurality of ultraviolet radiation sources can be of the same source or of a combination of different ultraviolet radiation sources.

Low and high power ultraviolet radiation sources (e.g., lamps) can be useful for forming rewettable asymmetric membranes. Lamp power can be expressed in watts/inch (W/in) based on the length of the lamp. For example, a high power lamp such as a 600 W/in electrodeless "H" bulb (Fusion UV Systems, Inc., Gaithersburg, Md.) is a 10-inch long medium-pressure mercury bulb that can be excited by microwave energy. At full power, the 10 inch lamp requires a power supply rated at 6000 W to deliver power of 600 W/in. Such high power lamps can generate copious amounts of UV radiation, but operate at lamp surface temperatures exceeding 700° C. such that the ultraviolet output is accompanied by significant IR emissions. In contrast, a low power fluorescent UV lamp can operate at a typical power of 1-2 W/in, and requires less power to operate having a surface temperature of about 43° C. to 49° C.

When exposing the coated porous substrate, the peak irradiance is greater than 0 mW/cm$^2$ in the spectral region of the peak ultraviolet intensity, and the spectral output must overlap with at least a portion of the absorption spectrum of the photoinitiator.

The UV spectrum is split into four primary spectral regions known as UVA, UVB, UVC and VUV, which are commonly defined as 315-400 nm, 280-315 nm, 200-280 nm and 100-200 nm, respectively. The wavelength ranges cited herein are somewhat arbitrarily established, and may not correspond to the exact wavelength ranges published by radiometer manufacturers for defining the four primary spectral regions. Furthermore, some radiometer manufacturers specify that a UVV range (395-445 nm) that spans the transition from UV to visible radiation.

In some instances, high power UV radiation sources can be employed These sources can have a peak irradiance of more than about 1 W/cm$^2$ accompanied by significant IR emissions. More preferred ultraviolet radiation sources can comprise an array of germicidal or fluorescent bulbs providing a peak UV irradiance in the range from about 1-2 µW/cm$^2$ to 10-20 mW/cm$^2$. The peak irradiance from an array or a plurality of microwave-driven fluorescent lamps commercially available from Quantum Technologies of Irvine, Calif., can be as high as 50 mW/cm$^2$. The actual irradiance from an array of lamps can depend on a number of factors which include the electrical voltage, the lamp's power rating, the lamp spacing within an array or plurality of lamps, the reflector(s) type (if present), the age of the individual lamps, the transmission spectrum of any windows or films through which the UV radiation must pass, the specific radiometer used and its spectral responsivity, and the distance of the array of lamps from the membrane.

The coated porous substrate can be exposed to the ultraviolet radiation source for a period of time (e.g., exposure time) for polymerizing the polymerizable composition to form the rewettable asymmetric membrane. Some exposure times can range from less than a second at high irradiance (>1 W/cm$^2$) to several seconds or longer at a low irradiance (<50 mW/cm$^2$). The total UV energy exposure to the porous substrate can be determined by the UV source irradiance and the exposure time. For example, an array of fluorescent or germicidal bulbs can be used to expose the porous substrate to UV radiation. The total UV energy within the spectral range associated with the peak lamp output can be from about 100 mJ/cm$^2$ to more than about 4,000 mJ/cm$^2$, from about 200 mJ/cm$^2$ to about 3,000 mJ/cm$^2$, from about 300 mJ/cm$^2$ to about 2,500 mJ/cm$^2$, or from about 400 mJ/cm$^2$ to about 2,000 mJ/cm$^2$.

The rewettable asymmetric membrane of the present disclosure can be prepared such that a gradient concentration of polymerized material extends from the first major surface through at least a portion of the thickness of the porous substrate to the second major surface. Upon exposure to the ultraviolet radiation source, the photoinitiator residing at the first major surface can be exposed to a greater peak irradiance of UV radiation. The higher peak irradiance at the first major surface can result in a higher rate of initiation at the first major surface and within the pores at or near the first major surface. As the irradiance travels into the thickness of the porous substrate, the peak irradiance decreases, thus reducing the amount of photoinitiator decomposition and hence, polymerization within the pores of the substrate.

A gradient concentration of polymerized material can be formed resulting from inner filter effects. The inner filter effects can occur when certain wavelengths are selectively filtered out by absorbing species (e.g. photoinitiators) as the ultraviolet radiation penetrates the thickness of the porous substrate. These wavelengths are effectively removed or diminished. As UV radiation penetrates further into or through the porous substrate, the wavelength distribution of the radiation impinging on the surface can be changed resulting from the absorption of certain wavelengths. At greater depths within the porous substrate, insufficient ultraviolet radiation of the prescribed wavelength region can be available to efficiently excite the photoinitiator. The extent of polymerization of the polymerizable composition can decrease rapidly, forming a gradient concentration of polymerized material within the thickness of the porous substrate.

The sharpness of the gradient concentration of polymerized material can be determined by the absorbance of the porous substrate at the wavelengths of the incident UV radiation. When sources other than substantially monochromatic sources are utilized, the absorbance is uncertain because absorbance is wavelength dependent. However, when substantially monochromatic sources are used, the absorbance (Beer-Lambert Law and measured using a UV-Visible spectrophotometer) at the peak wavelength of the radiation source through a film of the polymerizable composition at a thickness comparable to the membrane thickness should be greater than 0.3, greater than 0.4, greater than 0.5 or greater than 0.6. In some embodiments, the absorbance can be greater than 1.0 or even greater than 2.0 and as high as 10 or even 20.

The coated porous substrate selected for exposure to the ultraviolet radiation source can have a thickness greater than about 10 micrometers. In some embodiments, the thickness of the coated porous substrate can be greater than about 1,000 micrometers, or greater than about 10,000 micrometers. The polymerizable composition can saturate or immerse the porous substrate sufficient for wetting at least a portion of the interconnected pores extending through the thickness of the substrate extending from the first major surface to the second major surface.

The irradiance of ultraviolet radiation received by the coated porous substrate can affect the extent to which the polymerizable species are polymerized. In some embodiments, at least 10 weight percent of the polymerizable species can be polymerized. In other embodiments, at least 20 weight percent, at least 30 weight percent, or at least 40 weight percent of the polymerizable species can be polymerized to form polymerized material residing within the thickness of the porous substrate.

The irradiance of the ultraviolet radiation delivered to the coated porous substrate can be dependent upon, but not limited to, processing parameters including the type of ultraviolet radiation source selected, the line speed (e.g., continuous process line) used, and the distance of the ultraviolet radiation source to the first major surface of the coated porous substrate. In some embodiments, the irradiance can be regulated by controlling the line speed. For example, at the irradiance delivered to the first major surface can be greater at lower line speeds, and the irradiance delivered to the first major surface at the first major surface can be reduced at faster line speeds.

The irradiance of the ultraviolet radiation source delivered to a coated porous substrate can be dependent upon the residence time as described above. The extent of polymerization of the polymerizable composition throughout the thickness of the porous substrate can be controlled by the irradiance and can affect the concentration of polymerized material distributed through the thickness of the coated porous substrate. The peak irradiance delivered through the thickness of the coated porous substrate is greater than 0 mW/cm$^2$.

In some embodiments, the irradiance at the coated porous substrate upon exposure to the ultraviolet radiation source can be at least about 0.5 micrometer extending into the thickness of the porous substrate from the first major surface. In another embodiment, the irradiance delivered to the coated porous substrate to polymerize the polymerizable composition can be at least about 1 micrometer from the first major surface. In some embodiments, the irradiance delivered to the coated porous substrate can affect the polymerizable composition to at least about 2 micrometers, to at least about 5 micrometers, to at least about 10 micrometers, or to at least about 25 micrometers extending into the thickness of the porous substrate. While low irradiation and longer exposures are preferred for using ultraviolet radiation sources, polymerizing the polymerizable composition as a matter of practical operation may necessitate speeds that can require higher irradiance and shorter exposures.

FIG. 1 illustrates a cross-section of a porous substrate 5 exposed to an ultraviolet radiation source 35. The membrane 5 has a first major surface 10, a second major surface 15, and an interstitial pore 70. The interstitial pore 70 can be coated with a mixture 25 comprising a polymerized material and a copolymer 20. The concentration of the polymerized material of the mixture 25 is greater at the first major surface 10 than at the second major surface 15. The polymerized material of the mixture 25 contacts the interstitial pore-mixture interface 55 in regions of the interstitial pore 70 where the polymerized material is present. The gradient of polymerized material is greater at the first major surface 10 than at the second major surface 15. As the concentration of the polymerized material decreases through the thickness of the porous substrate, the copolymer 20 concentration can increase. The copolymer 20 concentration is greater such that the copolymer 20 can collect on the surfaces of the interstitial pore 70 extending through the thickness of the substrate 5 to the second major surface 15. A mixture-copolymer interface 60 represents a location within the interstitial pore 70 where the mixture 25 contacts the copolymer 20. At the mixture-copolymer interface 60, the concentration of polymerized material of the mixture 25 is negligible and the copolymer 20 coats the interstitial pore 70. A copolymer-interstitial pore interface 40, 45 exists where the copolymer 20 contacts an interior pore volume of the interstitial pore 75 with negligible polymerized material. The copolymer and the polymerized material of the mixture 25 can coat the first major surface (not shown) after exposure to the ultraviolet radiation source 35. The copolymer 20 can collect or coat on the second major surface 15 which is substantially free of the polymerized material.

In some embodiments, a rewettable asymmetric membrane can be formed using a multilayer structure wherein the porous substrate is coated with a polymerizable composition as previously described to provide a coated porous substrate. A first layer can be positioned adjacent to the first major surface of the coated porous substrate, and a second layer can be positioned adjacent to the second major surface of the coated porous substrate to thereby form a multilayer structure. The first layer and the second layer may be discrete pieces of materials or they may comprise continuous sheets of materials. On a continuous process line, for example, the first layer and the second layer may be unwound from rolls and brought into contact with the coated porous substrate. In the foregoing embodiments wherein the coated porous substrate is positioned (i.e., sandwiched) between a first layer and a second layer to form a multilayer structure, a single roller or multiple rollers may be used to meter or remove excess polymerizable composition and entrapped air bubbles from the coated porous substrate. The first layer and the second layer of the multilayer structure may comprise any inert material that is capable of providing temporary protection to the membrane from exposure to oxygen upon exiting the ultraviolet radiation source. Suitable materials for the first layer and the second layer include, for example, sheet materials selected from polyethylene terephthalate (PET), biaxially oriented polypropylene (BOPP), fluorinate polyolefin available from 3M Company and Dupont, other aromatic polymer film materials, and any other non-reactive polymer film material. The first layer should be substantially transparent to the peak emission wavelength of the ultraviolet radiation source selected. Once assembled, the multilayer structure typically proceeds to irradiation by the ultraviolet radiation source. After irradiation, the first layer and the second layer can be removed (i.e., eliminated) from the multilayer structure to provide the rewettable asymmetric membrane.

The thickness of the first layer of the multilayer structure can generally be in a range of 10 micrometers to 250 micrometers, 20 micrometers to 200 micrometers, 25 micrometers to 175 micrometers, or 25 micrometers to 150 micrometers. The second layer may have the same or a different thickness than that of the first layer. The first layer may be the same material or a different material that that used for the second layer.

In some embodiments, a first layer is positioned adjacent to the first major surface on the coated porous substrate to form a bi-layer structure. The first layer can be positioned between the ultraviolet radiation source and the coated porous substrate. After irradiation by the ultraviolet radiation source, the first layer can be removed (i.e., eliminated) from the bi-layer structure to provide the rewettable asymmetric membrane.

In another embodiment, the coated porous substrate is free of a first layer and a second layer. The coated porous substrate may be subjected to an inert atmosphere (e.g., nitrogen, argon) to reduce the penetration of oxygen (e.g., provide an oxygen free environment) to the coated porous substrate.

The penetration of the ultraviolet radiation source can be limited by the selection of the ultraviolet radiation source through the coated porous substrate to produce a gradient of polymerized material within the rewettable asymmetric membrane that can result in different polymerized material compositions on the first major surface and the second major surface. In some embodiments, polymerized material and a copolymer can reside on the first major surface and within a portion of the thickness of the porous substrate. The polymerized material and the copolymer residing within the thickness of the porous substrate can have a gradient concentration of polymerized material extending from the first major surface to the second major surface. The copolymer can coat the remainder of the interstitial pores such that the second major surface is substantially free of the polymerized material. In one embodiment, a rewettable asymmetric membrane has a hydrophilic first major surface and a hydrophobic second major surface.

A rewettable symmetric membrane formed by the method of the present disclosure can have a variety of surface properties and structural characteristics depending on a number of factors. These factors include without limitation the physical and chemical properties of the porous substrate, the geometry of the pores of the porous substrate (i.e., symmetric or asymmetric), the method of forming the porous substrate, the polymeric species polymerized and retained as polymerized material with the surfaces (i.e., first major, interstitial pore, and second major) of the coated porous substrate, optional post-polymerization treatments (e.g., a heating step) administered to the rewettable asymmetric membrane, and optional post-polymerization reactions (e.g., reactions of the additional functional group of the polymerizable species with a compound such as a nucleophilic compound or a compound with an ionic group).

Rewettable asymmetric membranes of the present disclosure can exhibit various degrees of wettability upon exposure to various polymerizable compositions. Wettability can often be correlated to the hydrophilic or hydrophobic character of the rewettable asymmetric membrane. As used herein, the term "instant wet" or "instant wettability" refers to the penetration of droplets of water into a given rewettable asymmetric membrane as soon as the water contacts the porous substrate surface, typically within less than 1 second. For example, a surface wetting energy of about 72 dynes or larger usually results in instant wetting. As used herein, the term "no instant wet" refers to penetration of droplets of water into a given substrate but not as soon as the water contacts the substrate surface. As used herein, the term "no wetting" refers to the lack of penetration of droplets of water into a given rewettable asymmetric membrane. For example, a surface wetting energy of about 60 dynes or less usually results in no wetting.

Application of polymerizable compositions onto a hydrophobic porous substrate and treating the coated hydrophobic porous substrate to ultraviolet radiation can result in a membrane having first and second major surfaces having hydrophilic character. Similarly, applying a polymerizable composition onto a hydrophilic porous substrate and treating the coated hydrophilic porous substrate to ultraviolet radiation can result in a rewettable asymmetric membrane having first and second major surfaces having hydrophilic character.

In some embodiments of the present invention, the surface properties (e.g., hydrophilic or hydrophobic) can be altered after exposure to the UV radiation source. For example, a treatment of a hydrophobic porous substrate with a hydrophobic polymerizable composition after irradiation can form an asymmetric membrane having a hydrophobic surface. The membrane can be exposed to a hot steam/vapor (autoclave) for changing the hydrophobic surface to a hydrophilic surface forming the rewettable asymmetric membrane.

The rewettable asymmetric membrane can be chemically asymmetric. The rewettable asymmetric membrane comprises a symmetric porous substrate having a first major surface and a second major surface, wherein the major surfaces (e.g., being hydrophilic) can contain polymerized material retained throughout at least a portion of the thickness of the porous substrate. The rewettable asymmetric membrane can have a greater concentration of polymerized material at the first major surface than at the second major surface.

The rewettable asymmetric membrane can be physically asymmetric. For example, the physically asymmetric porous substrate can have a greater concentration of the polymerized material at the first major surface than at the second major surface. In some embodiments, the gradient of polymerized material can contribute to at least partially blocking of the pores on at least one major surface and an increased pore size extending through the thickness of the porous substrate to a second major surface.

In one aspect, a rewettable asymmetric membrane is formed. The rewettable asymmetric membrane comprises a porous substrate having a polymerized material and a copolymer retained within the porous substrate as described in FIG. 1. The polymerized material has a concentration greater at a first major surface than at a second major surface. The copolymer collects on the remainder of the interstitial pores. The second major surface is substantially free of the polymerized material. In one embodiment, the rewettable asymmetric membrane is a water softening membrane.

Rewettable asymmetric membranes formed have a greater concentration of polymerized material at the first major surface than at the second major surface and copolymer collecting on the remainder of the interstitial pores of the membrane. Rewettable asymmetric membranes can find applications in water softening, filtration, and chromatography.

The disclosure will be further clarified by the following examples which are exemplary and not intended to the limit the scope of the disclosure.

EXAMPLES

The present disclosure is more particularly described in the following non-limiting examples. Unless otherwise noted, all parts, percentages, and ratios reported in the following examples are on a weight basis.

Test Procedures

Water Flux Measurements and $MgCl_2$ Rejection Measurements

Water flux and $MgCl_2$ (magnesium chloride, salt) rejection measurements of the rewettable asymmetric membrane prepared were measured with a stirred ultrafiltration cell (model 8400; Millipore Corporation, Bedford, Mass.) having an active surface area of 41.8 $cm^2$. The trans-membrane pressure was set at 50 psi (pounds per square inch) under pressurized nitrogen gas. Water flux was calculated based upon the amount of water passing through the membrane as a function of time, asymmetric membrane area, and the set pressure. The $MgCl_2$ rejection (salt rejection) was obtained from the conductivities of the permeate ($C_p$) and the feed ($C_f$) (500 ppm $MgCl_2$ aqueous solution) according to the following equation;

$$R(MgCl_2) = \left(1 - \frac{C_p}{C_f}\right) \times 100\%$$

R=percent salt rejection.

The conductivity ($C_p$ and $C_f$) was measured with a conductivity meter (VWR Digital Conductivity Bench Meter; VWR International, West Chester, Pa.), and the mass of permeate was measured by an electronic balance (model TE3102S; Sartorius, Edgewood, New York). The conductivity and the mass of the permeate data were collected as a function of time using Winwedge 32 computer software (TAI Technologies, Philadelphia, Pa.). Measurements were discontinued after the salt rejection measurements started to decline after reaching a plateau. The salt rejection was adjusted by the feed concentration at the end of testing.

Rewettable Asymmetric Membrane Process

Rewettable symmetric membranes were prepared by a continuous process. A polypropylene thermally induced phase separation (TIPS) membrane as described in U.S. Pat. No. 4,726,989 (Mrozinski) was die-coated with a polymerizable composition to form a coated porous substrate. The coated porous substrate was laminated between two liners in a gap-controlled nip. One of the two liners (e.g., films) was laminated to the first major surface and the other liner was laminated to the second major surface forming a multilayer structure. The biaxially oriented polypropylene liners ((BOPP) films of 1.18 mil (30 micrometer) thickness; 3M Company, St. Paul, Minn.) had a transmittance of about 78.5 percent (UVC) and 85.9 percent (UVA). The edges of the multilayer structure (i.e. edges of the two liners) were sealed with a pressure sensitive adhesive tape (Scotch ATG Tape 926; 3M, St. Paul, Minn.). The multilayer structure was enveloped by the BOPP liners and the excess polymerizable composition on the coated porous substrate was minimized. The multilayer structure was irradiated with a Quantum Microwave Multi-Lamp UV Curing System having a 47" long UV window (Model: Quant-23/48R, Quantum Technologies; Irvine, Calif.). The Quantum UV System used either UVA lamps (26169-3, UV A 365 nm Peak Lamps TL60/10R, Philips, Somerset, New Jersey) or UVC lamps (23596-0, Germicidal Sterilamp 254 nm Lamps TUV115W, Philips, Somerset, New Jersey). The line speed was adjusted using the machine speed display. The intensity of the ultraviolet radiation source was measured by a PowerMap radiometer (EIT UV Power MAP Spectral Response, UV: A, B, C, V, Range: Low, Head S/N 1408, Body S/N 1022; Sterling, Va.) as the multilayer structure was carried through the UV tray. The polymerizable composition was polymerized forming polymerized material retained within the porous substrate. The multilayer substrate was collected on a roll and the liners were removed. A rewettable asymmetric membrane was recovered. The rewettable asymmetric membrane was washed with distilled water prior to further testing.

Example 1

A polypropylene microporous TIPS membrane (bubble point pore diameter=0.8 µm, thickness of about 4.5 mil (105-115 µm (micrometers)) was die coated with a polymerizable composition. The polymerizable composition comprised (3-Acrylamidopropyl) trimethyl ammonium chloride ((APTAC) 75 wt. % in water; Sigma Aldrich, St. Louis, Mo.); butyl vinyl ether ((BVE) 98%; Alfa Aesar, Avocado, Lancaster, England); N,N'-methylenebisacylamide (99%; Alfa Aesar, Ward Hill, Massachusetts); and 1-[4-(2-Hydroxyethoxy)-phenyl]-2-hydroxy-2-methyl-1-propane-1-one (Irgacure 2959, Ciba Specialty Chemicals, Tarrytown, New York) in an ethanol/water mixture (70/30 volume:volume ratio). The APTAC concentration was 0.48 mol/kg, the N,N'-methylenebisacylamide concentration was 20 mole percent relative to the concentration of APTAC, and the Irgacure 2959 concentration was 2 mole percent relative to the concentration of APTAC. The molar ratio of APTAC to BVE was 55:45. No pretreatment was required. The polymerizable composition was applied to the polypropylene TIPS membrane for forming a coated porous substrate. The coated porous substrate was prepared as described by the Rewettable Asymmetric Membrane Process prior to forming a multilayer structure, and prior to irradiation by the UV radiation source. The multilayer structure was conveyed by a continuous process apparatus at a line speed of about 30.5 cm/minute. The first major surface (side A) of the coated porous membrane was irradiated by a UVC radiation source (light intensity about 6.0 mW/cm$^2$ as measured by a PowerMap radiometer (EIT, Sterling, Va.)). The results of Example 1 are listed in Table 2.

Example 2

Example 1 was dipped in isopropanol ((IPA), 99%; Brenntag, Butler, Wisconsin) for 10 minutes, and then air dried for forming Example 2. Example 2 was mounted on a testing holder for testing water flux and salt rejection. The membrane was not transparent after testing suggesting that the membrane was not fully rewetted. Testing results of Example 2 are listed in Table 2.

Example 3

The membrane of Example 2 was dipped into isopropanol (e.g., pretreatment) to wet the membrane before transferring into a water bath for solvent exchange thus forming Example 3. Example 3, as a fully wetted membrane, was tested for water flux and salt rejection. The results of Example 3 are listed in Table 2.

TABLE 2

| Membrane | Pretreatment | Pure Water Flux (kg/m$^2$-h-psi) | 500 ppm MgCl$_2$ Flux (kg/m$^2$-h-psi) | 500 ppm MgCl$_2$ Rejection (%) |
|---|---|---|---|---|
| Example 1 | None | 1.26 | 1.09 | 86.83 |
| Example 2 | None | 0.67 | 0.57 | 84.92 |
| Example 3 | Isopropanol | 1.20 | 1.08 | 86.22 |

Example 3 had similar water flux and salt rejection performance to Example 1.

Example 4

A polypropylene microporous TIPS membrane (bubble point pore diameter=0.72 micrometers, thickness of about 4.3 mil (105-115 micrometer)) was die coated with a polymerizable composition. The polymerizable composition comprised (3-Acrylamidopropyl) trimethyl ammonium chloride ((APTAC); an ethylene-vinyl alcohol copolymer (EVAL 27, ethylene content of about 27 mole percent; Sigma Aldrich, St. Louis, Mo.); N,N'-methylenebisacylamide; and 1-[4-(2-Hydroxyethoxy)-phenyl]-2-hydroxy-2-methyl-1-propane-1-one (Irgacure 2959) in an ethanol/water mixture (70:30 volume:volume ratio). The APTAC concentration was 0.45 mol/kg, the N,N'-methylenebisacylamide concentration was 10 mole percent relative to the concentration of APTAC, and the Irgacure 2959 concentration was 2 mole percent relative to the concentration of APTAC. The porous substrate required no pretreatment. The concentration of EVAL 27 in the polymerizable composition was 2.5 weight percent. The polymerizable composition was applied to the polypropylene TIPS membrane for forming a coated porous substrate. The coated porous substrate was prepared as described by the Rewettable Asymmetric Membrane Process prior to forming a multilayer structure, and prior to irradiation by the UV radiation source. The multilayer structure was conveyed by a continuous process apparatus at a line speed of about 30.5 cm/minute. The first major surface (side A) of the coated porous membrane was irradiated by a UVC radiation source (light intensity about 6.0 mW/cm$^2$). The wet membrane was washed by immersing in water for at least two hours, such that the water was changed periodically changed (3 times). Example 4 was cut and tested for water flux and salt rejection. The results for Example 4 are listed in Table 3.

Example 5

The membrane of Example 4 was dipped in ethanol for 10 minutes for forming Example 5. Example 5 was air dried for 12 hours at ambient conditions. Example 5 after drying had a white color. The dried membrane was immersed in water and became transparent. Example 5 was mounted on the testing holder for water flux and salt rejection measurements. The results for Example 5 are listed in Table 3.

Example 6

A polypropylene microporous TIPS membrane (bubble point pore diameter=0.72 micrometers, thickness of about 4.3 mil (105-115 micrometer)) was die coated with a polymerizable composition. The polymerizable composition comprised (3-Acrylamidopropyl) trimethyl ammonium chloride ((AP-TAC); an ethylene-vinyl alcohol copolymer (EVAL 27, ethylene content of about 27 mole percent; N,N'-methylenebisacylamide; and 1-[4-(2-Hydroxyethoxy)-phenyl]-2-hydroxy-2-methyl-1-propane-1-one (Irgacure 2959) in an ethanol/water mixture (60:40 volume:volume ratio). The APTAC concentration was 0.45 mol/kg, the N,N'-methylenebisacylamide concentration was 10 mole percent relative to the concentration of APTAC, and the Irgacure 2959 concentration was 2 mole percent relative to the concentration of APTAC. The concentration of the EVAL 27 in the polymerizable composition was 2.5 weight percent. The porous substrate required no pretreatment. The polymerizable composition was applied to the polypropylene TIPS membrane for forming a coated porous substrate. The coated porous substrate was prepared as described by the Rewettable Asymmetric Membrane Process prior to forming a multilayer structure, and prior to irradiation by the UV radiation source. The multilayer structure was conveyed by a continuous process apparatus at a line speed of about 30.5 cm/minute. The first major surface (side A) of the coated porous membrane was irradiated by a UVC radiation source (light intensity about 6.0 mW/cm$^2$). The wet membrane was washed by immersing in water for at least two hours, such that the water was changed periodically changed (3 times). Example 6 was cut and tested for water flux and salt rejection. The results for Example 6 are listed in Table 3.

Example 7

The membrane of Example 6 was dipped in ethanol for 10 minutes for forming Example 7. Example 7 was air dried for 12 hours at ambient conditions. Example 7 after drying had a white color. The dried membrane was immersed in water and became transparent. Example 7 was mounted on the testing holder for water flux and salt rejection measurements. The results for Example 7 are listed in Table 3.

TABLE 3

| Membrane | Pure Water Flux (kg/m$^2$-h-psi) | 500 ppm MgCl$_2$ Flux (kg/m$^2$-h-psi) | 500 ppm MgCl$_2$ Rejection (%) |
| --- | --- | --- | --- |
| Example 4 | 1.40 | 1.25 | 82.95 |
| Example 5 | 1.22 | 1.11 | 87.79 |
| Example 6 | 1.64 | 1.46 | 80.14 |
| Example 7 | 1.21 | 1.23 | 86.28 |

Example 5 and 7 showed rewettable asymmetric membranes which were fully rewettable.

Various modifications and alterations of this disclosure will be apparent to those skilled in the art without departing from the scope and spirit of this disclosure, and it should be understood that this disclosure is not limited to the illustrative elements set forth herein.

What is claimed is:

1. A method of forming a rewettable asymmetric membrane comprising:
   providing a porous substrate having a first major surface, interstitial pores, and a second major surface;
   applying a polymerizable composition to the first major surface of the porous substrate to provide a coated porous substrate, wherein the polymerizable composition wets the porous substrate through the entire thickness of the porous substrate, the polymerizable composition comprising
   i) at least one polymerizable species;
   ii) at least one copolymer comprising hydrophilic and hydrophobic groups;
   iii) at least one photoinitiator; and
   iv) a solvent;
   exposing the coated porous substrate to ultraviolet radiation comprising a peak emission wavelength less than about 340 nm to polymerize the polymerizable composition in a gradient extending from the first major surface through a portion of the thickness of the porous substrate and provide the rewettable asymmetric membrane; and
   removing a portion of the solvent from the rewettable asymmetric membrane by evaporation to coat the copolymer on at least a portion of the second major surface and the interstitial pores unoccupied by polymerized material, the rewettable asymmetric membrane comprising polymerized material on the first major surface and a gradient of polymerized material extending from the first major surface to the second major surface with copolymer within portions of the interstitial pores unoccupied by the polymerized material, wherein the pores are partially filled with a mixture of the polymerized material and the copolymer, each interstitial pore comprising an interface between the mixture and a coating of the copolymer on the interstitial pores that extends from the interface to the second major surface, and wherein the second major surface is substantially free of the polymerized material.

2. The method of claim 1, further comprising immersing the rewettable asymmetric membrane in a liquid bath to precipitate the copolymer onto the portion of the interstitial pores unoccupied by the polymerized material.

3. The method of claim 1, wherein the porous substrate is microporous.

4. The method of claim 1, wherein the porous substrate comprises a microporous, thermally-induced phase separation membrane.

5. The method of claim 1, wherein the porous substrate comprises polyolefins, polyamides, fluorinated polymers, poly(ether)sulfones, cellulosics, poly(ether)imides, polyacrylonitriles, polyvinyl chlorides, ceramics, or combinations thereof.

6. The method of claim 1, wherein the porous substrate comprises polyolefins.

7. The method of claim 6, wherein the polyolefins comprise polyethylene or polypropylene.

8. The method of claim 5, wherein the porous substrate comprises polyamides.

9. The method of claim 8, wherein the polyamides comprise nylon 6,6.

10. The method of claim 1, wherein at least one of the polymerizable species comprises (meth)acrylamides.

11. The method of claim 1, wherein at least one of the polymerizable species comprises an ionic group.

12. The method of claim 11, wherein the ionic group comprises a sulfonic acid or a sulfonic acid salt.

13. The method of claim 11, wherein the ionic group comprises an amine or a quaternary ammonium salt.

14. The method of claim 11, wherein the ionic group comprises a carboxylic acid or a carboxylic acid salt.

15. The method of claim 11, wherein the ionic group comprises a phosphonic acid or a phosphonic acid salt.

16. The method of claim 11, wherein the ionic group is positively charged.

17. The method of claim 11, wherein at least one of the polymerizable species comprises an ionic group comprising a quaternary ammonium salt.

18. The method of claim 11, further comprising at least one polymerizable species comprising a nonionic group.

19. The method of claim 1, wherein the polymerizable composition further comprises a crosslinker.

20. The method of claim 1, wherein the ultraviolet radiation source comprises a plurality of monochromatic radiation sources.

21. The method of claim 20, where the plurality of monochromatic radiation sources comprises excimer lamp sources, mercury lamp sources, light emitting diodes, laser sources, or combinations thereof.

22. The method of claim 1, wherein the ultraviolet radiation source comprises a plurality of fluorescent radiation sources.

23. The method of claim 20, wherein the ultraviolet radiation source comprises monochromatic radiation sources, fluorescent radiation sources or combinations thereof.

24. The method of claim 1, further comprising positioning the coated porous substrate between a transparent first layer and a second layer to form a multilayer structure, the transparent first layer positioned adjacent to the first major surface and the second layer positioned adjacent to the second major surface, the transparent first layer nearest the ultraviolet radiation source, and wherein exposing the coated porous substrate to the ultraviolet radiation source comprises exposing the multilayer structure to the ultraviolet radiation.

25. The method of claim 24, further comprising removing the transparent first layer and the second layer from the multilayer structure after treating the coated porous substrate with the ultraviolet radiation source having a peak emission wavelength less than 340 nm.

26. A rewettable hydrophilic membrane formed by the method of claim 1.

27. The method of claim 1, wherein at least one of the polymerizable species comprises acrylates, methacrylates, styrenics, allylics, vinyl ethers, or combinations thereof.

* * * * *